Figure 1:
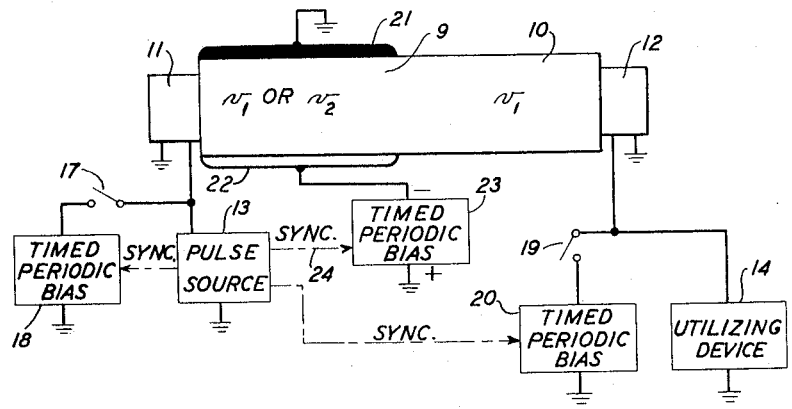

Dec. 27, 1966  D. L. WHITE  3,295,064

ULTRASONIC PULSE MODIFIER

Filed June 20, 1962

INVENTOR
*D.L. WHITE*
BY *Ray M. Porter Jr.*

ATTORNEY

United States Patent Office 3,295,064
Patented Dec. 27, 1966

3,295,064
ULTRASONIC PULSE MODIFIER
Donald L. White, Mendham, N.J., assignor to Bell Telephone Laboratories, Incorporated, New York, N.Y., a corporation of New York
Filed June 20, 1962, Ser. No. 203,835
5 Claims. (Cl. 328—58)

This invention relates to ultrasonic wave transmission devices, and more particularly, to devices in which the time spectrum of a pulse of ultrasonic or acoustic wave energy, is modified by the properties of an ultrasonic delay medium.

There are numerous occasions in various pulse handling systems, such as data transmission systems, digital computers, telephone switching systems, radar systems and the like where there is a known need for changing the frequency of components making up an information pulse or compressing or expanding the time duration of an information pulse. A number of electronic devices of varying degrees of complexity, reliability and cost are known which perform these functions. On the other hand, the use of ultrasonic devices for performing various functions in pulse systems has enjoyed considerable recent interest because of their simplicity, reliability and economy. These ultrasonic devices take advantage of the fact that the velocity of propagation of a mechanical vibration or an acoustic wave is much lower than that of electrical signals by transforming the electrical signal into the ultrasonic wave, sending the ultrasonic wave down a mechanical path of predetermined length, and reconverting the wave into an electrical signal at the far end.

It is, therefore, an object of this invention to compress or expand a pulse of ultrasonic wave energy.

It is a further object to increase or decrease the frequencies of components and the energy level of a pulse upon an ultrasonic wave energy transmission path.

In accordance with the present invention it has been recognized that if the velocity of propagation of a section of ultrasonic delay line is increased while a pulse is on that section, the wave length and the space that it occupies on the line will be unchanged. However, since the components which make up the pulse are now passing a given reference point at a faster rate, the frequency of the pulse has in effect been increased and its time duration has been decreased.

These principles are taken advantage of in the illustrative embodiment of the invention to be described by employing one or more members of low resistivity, semiconductive, piezoelectric material as one or more portions of the ultrasonic wave path. Electrodes are provided along each portion of the path by means of which a direct-current potential is applied to deplete the number of charge carriers normally present in that portion and increase the ultrasonic velocity therein as compared to other portions of the path.

Figure 2:
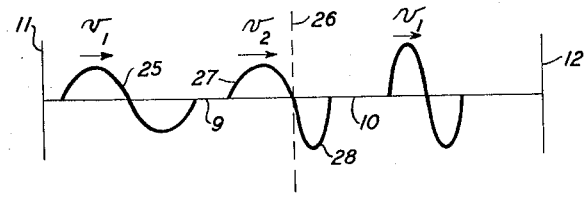
Figure 3:
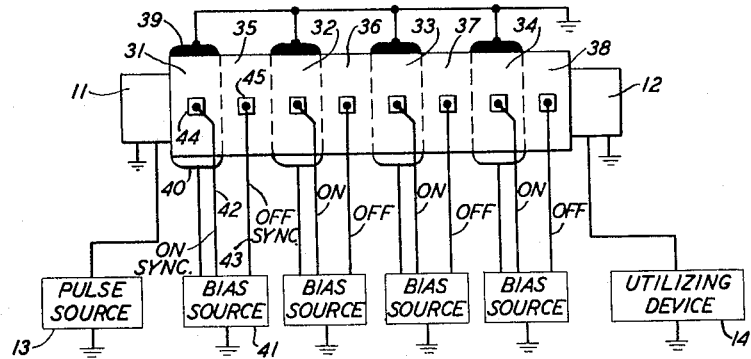

The above-mentioned objects, the nature of the present invention, its various advantages and features will appear more fully upon consideration of the following detailed description taken in connection with the drawings in which:

FIG. 1 is a representation, partly schematic and partly diagrammatic, of a single section embodiment of the invention;

FIG. 2, given for the purpose of explanation, is a pulse in various relationships along the embodiment of FIG. 1; and FIG. 3 is a representation of a multisection embodiment of the invention.

Referring more particularly to FIG. 1, two sections, 9 and 10, of a pulse modifying ultrasonic delay line are shown interposed between ultrasonic transducers 11 and 12. Transducer 11 converts the electrical pulse received from source 13 into acoustic vibrations for travel down sections 9 and 10 of the line to transducer 12 which converts the acoustical energy into electrical signals to be delivered to utilization device 14. Transducer 12 may optionally be followed by an acoustical wave absorber to absorb and dissipate any vibrations not converted by transducer 12 into electrical signals, thereby preventing reflection along sections 9 and 10. A similar acoustical absorber may precede transducer 11 which absorbs and dissipates reflections that arise along line 10 as a result of the process to be described. These components are all conventional in the art and no further consideration need be given to them.

Section 9 of the delay line has the property that the velocity of propagation of ultrasonic energy thereon may be switched between a low velocity of propagation $v_1$ and a higher velocity of propagation $v_2$.

While the velocity of section 9 may be varied in numerous ways known to the art, a preferred embodiment employs one of the variable delay lines described in detail in my copending application Serial No. 153,088, filed November 17, 1961. Thus, section 9 comprises a strip of low resistivity, semiconductive, piezoelectric material of either n or p-type preferably formed from a single crystal. This material may comprise one of the group III–V or II–VI compounds that are piezoelectric when in high resistivity form. A preferred material from group III–V is gallium arsenide and one from group II–VI is cadmium sulphide. One longitudinal face of section 9 is provided with a suitable ohmic contact 22. The opposite face is provided with a suitable nonohmic or rectifying contact 21. Alternatively, both contacts may be nonohmic. Suitable materials that form nonohmic contacts with the materials here contemplated are well known. For example, gold forms a nonohmic contact with gallium arsenide and also with cadmium sulphide.

When a back bias potential is applied between contacts 21 and 22 from a source 23 of timed, periodic direct-current, a depletion layer will develop adjacent to the nonohmic contact. The polarity illustrated for source 23 to produce the proper back bias assumes that the section 9 is formed of p-type material. As is described in detail in the above-mentioned application, a depletion layer is a region in a semiconductor in which the charge carriers normally present in the material have been swept out by the electric field. Since there are no carriers in the depletion layer, the material behaves as if it were of high resistivity and the velocity of ultrasonic energy in the layer is, therefore, higher than in the normal semiconductor from which the depletion layer was formed. By electrically varying the depth of the layer, the velocity along the path may be electrically varied. It will become apparent that any form of electrically variable ultrasonic delay line may be employed for section 9 including other structures utilizing depletion layers which are disclosed in the above-mentioned application.

Section 10, on the other hand, requires no special characteristics and may therefore be made of any material normally used as an ultrasonic delay medium which has a constant velocity of propagation. In the first mode of operation to be described for the embodiment of FIG. 1, section 10 merely serves as an ultrasonic connection between the end of section 9 and output transducer 12. However, its presence is convenient for explaining this first mode of operation. In a second mode of operation to be described, section 10 performs an essential function. Therefore, according to a preferred construction of the invention suitable for either mode of operation, section 10 may be formed as an integral extension of the same strip forming section 9 and has a constant velocity $v_1$. Section 9 thus comprises the portion of this strip included between electrodes 21 and 22 having a velocity of either $v_1$ or $v_2$ depending upon the bias applied thereto.

Source 23 represents any suitable source of repetitive voltage applied to electrodes 21 and 22 such as a multivibrator or square wave generator. The timing of the signal produced by source 23 is coordinated with the duration and repetition rate of pulses from source 13 as represented schematically by synchronizing connection 24, and with the transit time of these pulses through section 9 so that the velocity in section 9 is increased from $v_1$ to $v_2$ between the time the trailing edge of each pulse has entered section 9 and before the leading edge thereof has left section 9. The applied bias and the velocity $v_2$ continues until the entire pulse has left section 9 at which time the velocity is again reduced to $v_1$ before a subsequent pulse enters the section. When these conditions are met, FIG. 2 represents the performance of the invention.

Referring to FIG. 2, wave 25 represents the major component of a pulse launched by transducer 11 on section 9 while the section is in its low velocity condition $v_1$. While the wave is completely within section 9 the velocity is increased to $v_2$. The spacial distribution of the wave does not change as shown by the trailing portion 27 still within section 9. Its frequency is increased, however, because it travels past a given reference point, such as interface 26, at a faster rate. While it is difficult to visualize or to illustrate the increased frequency of the pulse while it is still in the original line, the fact that it has been increased is apparent when the pulse passes into a slower section or into an output transducer where its spacial distribution will be shortened to correspond to the increased frequency. Thus, for the purpose of illustration, allow the pulse to pass into section 10 which has a velocity $v_1$ less than $v_2$. As the leading portion 28 crosses the interface 26 and is slowed down and the trailing portion 27 tends to overtake it, the wave length is shortened and the increase in frequency is "frozen" into the pulse. The increase in frequency, the decrease in time length of the pulse and the increase in energy level of the pulse are all inversely proportional to the ratio of the change from $v_1$ to $v_2$ in section 9 regardless of what happens in section 10. Some energy will be reflected at interface 26 but this loss will be adequately compensated by the increase in energy level.

The invention has been presented thus far as a pulse compressor since this function is the one most usually desired in digital systems. It should be noted, however, that the invention may be operated as a pulse expander by applying the pulse to section 9 when its velocity is $v_2$ and reducing the velocity to $v_1$ while the pulse is contained within the section.

In the first mode of operation thus described each pulse has been modified (either compressed and raised in frequency or expanded and decreased in frequency) once during its passage between the input and output transducers. While it is theoretically possible to obtain as large a modification as desired in a single operation, practical difficulties, such as the undue acoustical impedance discontinuity that is produced at the interface or the difficulty of changing the propagation velocity of a simply constructed line by a large amount, make it desirable to obtain large changes by repetitive smaller modifications of each pulse.

The embodiment of FIG. 1 may be utilized according to a second mode of operation to produce repetitive modifications by utilizing multiple reflections of each pulse within sections 9 and 10. For this purpose means are provided for disabling input transducer 11 after a pulse has been launched in section 9 and for causing the transducer to become reflective to ultrasonic energy during the period for which it is disabled. Similarly, means are provided for disabling the output transducer 12 and causing it to be reflective until it is enabled in order to receive the modified pulse. While numerous ways will occur to one skilled in the art for disabling the transducers, FIG. 1 illustrates a preferred way. For this purpose, for example, transducers 11 and 12 are assumed to be formed as disclosed in my United States patent 3,185,-935, granted May 25, 1965, from a piezoelectric semiconductive material, such as CdS or ZnO, biased to produce a depletion layer of resistivity high enough to exhibit piezoelectric effects. Thus, switches 17 and 19 are provided in the circuits of tranducers 11 and 12, respectively. When these switches are closed for operation according to the second mode, sources 18 and 20 of timed periodic bias voltages are superimposed upon the transducers. A parallel connection is indicated but for certain transducers a series connection would be preferred. The voltages are timed to coincide with the periods to be described during which the transducers are to be disabled and are of such magnitude and polarity for the type of transducer employed such that the depletion layer is either eliminated, changed in thickness out of the operating range or overdriven. Thus, a substantial mismatch (either in terms of frequency or acoustical impedance) is electrically created between the transducer and the delay line when the bias is applied. Since reflections are desired, absorbing terminations associated with the transducers are not required. The timing of the wave forms produced by sources 18 and 20 is so correlated with the repetition rate and duration of pulses from source 13 to produce the following sequence of operation. Thus, a pulse from source 13 is applied by transducer 11 to section 9. Transducers 11 and 12 are then disabled. Bias is applied from source 23 to increase the velocity of section 9. The pulse which has now been modified a first time travels into section 10 and the bias from source 23 is removed from section 9. The pulse is reflected by disabled transducer 12, re-enters section 9 traveling toward transducer 11. Upon being reflected by disabled transducer 11, bias is again applied to section 9 during the period that the pulse is returning along section 9. The pulse which has now been modified a second time passes into section 10. The sequence is repeated to produce the desired number of reflections and modifications. After this time, bias from sources 18 and 20 is removed to enable the transducers so that the modified pulse can be removed by transducer 12 and a new pulse launched in the system by transducer 11. Alternatively, a single transducer may be employed to successively remove a modified pulse and then apply a new one.

As an alternative to disabling the transducers, the frequency increase that accompanies pulse compression or the frequency decrease that accompanies pulse expansion may be utilized by making the input transducer 11 and the output transducer 12 highly frequency selective at different frequencies. Thus, a pulse launched by input transducer 11 is reflected by output transducer 12. Its frequency having been shifted, the pulse is now reflected by input transducer 11 until the successive frequency changes in the pulse have shifted its frequency into the band of output transducer 12 through which it passes to utilizing device 14.

It should be appreciated that successful timing of the several operations involved in the foregoing modes of operation depend upon an input pulse train that is consistent in repetition rate and pulse duration. Such a pulse train is found in digital systems where information is conveyed merely by the presence or absence of a pulse in a given and fixed time slot. A more flexible embodiment with respect to timing will now be described in connection with FIG. 3.

Turning now to FIG. 3, an illustrative embodiment of the invention is shown comprising a plurality of sections 31 through 34, each of which is capable of having either a velocity $v_1$ or $v_2$. Each of these sections is followed by a section of fixed velocity 35 through 38, respectively. The combined length of each variable velocity section and its associated fixed velocity section should be short enough that the transit time of the pulse therethrough is less than the minimum expected time between pulses, and the length of each section should be long enough to easily contain the expected maximum duration of each pulse. The electrodes of each section 31 through 34, such as 39 and 40 of section 31, are connected to suitable sources, such as 41, which are capable of applying direct-current voltages between the electrodes upon receipt of ON synchronizing signals and of removing this voltage upon receipt of OFF synchronizing signals. The ON and OFF synchronizing signals for the source 41 for electrodes 39 and 40 are obtained respectively by way of leads 42 and 43 from ultrasonic taps 44 and 45 located for convenience near the center of sections 31 and 35, respectively. Each tap is suitably adapted to register the presence of pulse energy within the center region of its section and to communicate this information to the bias source. Suitable ultrasonic taps are disclosed in the United States Patent 2,828,470 granted to W. P. Mason, Patent 2,965,851 granted to J. E. May, or in my copending application Serial No. 147,283, filed October 24, 1961, now abandoned.

In operation, a first pulse is launched within section 31 in its low velocity condition. When the pulse is completely contained within the section its presence is detected at tap 44 and bias is applied from source 41 to increase the velocity in the section. The pulse then passes into section 35 where its presence is detected at tap 45 which reduces the bias of section 31 readying it for the receipt of a second pulse from the train. The first pulse now passes successively into section 32 and the following sections where the operation is repeated. Since the spacial distribution of each pulse is changed each time its frequency is changed the physical lengths of progressive sections 31 through 34 or 35 through 38 may be similarly changed. Thus, in the cases of a pulse compressor or frequency increaser, the length of each higher numbered section may be shorter than the section preceding it and still be able to accommodate the shortened pulse.

The foregoing embodiment anticipates irregularities in pulse repetition rates and durations. However, in a digital system where these quantities are fixed, the embodiments may be simplified by employing a common bias source for all sections. Further, the bias source may be synchronized from the input pulse or may be self-timed to eliminate either or both of the synchronizing signals and their associated taps. Timing and synchronizing will be substantially simplified by having all sections of the same length.

As disclosed in more detail in the copending application of A. R. Huston Serial No. 23,441, filed April 20, 1960, certain photosensitive piezoelectric materials, of which cadmium sulphide is exemplary, have velocities of propagation that depend upon the optical illumination of the material. Therefore, if section 9 of FIG. 1 or sections 31 through 34 of FIG. 3 are formed of one of these materials, the desired change in propagation velocity may be obtained by changing the level of illumination of the section.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:
1. In combination, a source of pulses of ultrasonic wave energy having a pulse duration period and a repetition period, a propagation medium to which said pulses are applied for propagation therealong, said medium having a length such that the transit period of one of said pulses along said length is longer than said duration period and shorter than said repetition period, at least a portion of the length of said medium being formed of a piezoelectric semiconductive material having sufficient mobile charge carriers to have low resistivity, means for receiving said pulses from said medium, and means having a periodic variation that bears an integral relationship to the repetition period of said pulses and is synchronized with the repetition of said pulses for changing the propagation velocity of said medium in a given direction during said transit period while one of said pulses is contained within said medium and in a direction opposite to said given direction when said pulse has left said medium, said last named means including means for applying bias potential to said material during the period that one of said pulses is contained in said portion for increasing the resistivity and the velocity of propagation of said ultrasonic energy in said portion.

2. The combination according to claim 1 including a section of ultrasonic delay line of constant velocity of propagation adjacent to said medium.

3. In combination, a source of pulses of ultrasonic wave energy, a propagation medium to which said pulses are applied having at least first and second adjacent portions, said first portion having a fixed velocity of propagation for said pulses, means for causing a pulse to be multiply reflected along said medium and for removing said pulse from said medium after multiple reflection, and means synchronized with the propagation of said pulses through said portions for changing the propagation velocity of said second portion for said pulses in a given direction while one of said pulses is contained within said second portion and in a direction opposite to said given direction while said pulse is contained within said first portion.

4. In combination, a source of pulses of ultrasonic wave energy, a propagation medium including a section of ultrasonic delay line of constant velocity of propagation, ultrasonic transducers for applying said pulses to said medium for propagation therealong and for receiving said pulses from said medium, means for periodically disabling said transducers to produce multiple reflections of said pulses through said medium, and means synchronized with said pulses and their propagation through said medium for changing the propagation velocity of a portion of said medium adjacent to said section in a given direction while one of said pulses is contained within said portion and in a direction opposite to said given direction when said pulse has left said portion.

5. In combination, a source of pulses of ultrasonic wave energy, a propagation medium to which said pulses are applied comprising a plurality of sections including a plurality of first portions alternately arranged with a plurality of second portions, said first portions each having a fixed velocity of propagation for said pulses, means synchronized with the propagation of said pulses through said sections for changing the propagation velocity of said second portions in a given direction while one of said pulses is contained within a second portion and in a direction opposite to said given direction while said pulse is contained within a first portion.

References Cited by the Examiner

UNITED STATES PATENTS

| | | | |
|---|---|---|---|
| 2,553,491 | 5/1951 | Shockley | 333—72 |
| 2,898,477 | 8/1959 | Hoesterey | 307—88.5 |
| 2,941,110 | 6/1960 | Yando | 315—3 |
| 2,945,984 | 7/1960 | Yando | 315—55 |
| 3,093,758 | 6/1963 | Hutson | 310—8 |
| 3,177,433 | 4/1965 | Simon et al. | 328—58 |
| 3,200,354 | 8/1965 | White | 333—30 |

HERMAN KARL SAALBACH, *Primary Examiner.*

C. BARAFF, *Assistant Examiner.*